UNITED STATES PATENT OFFICE.

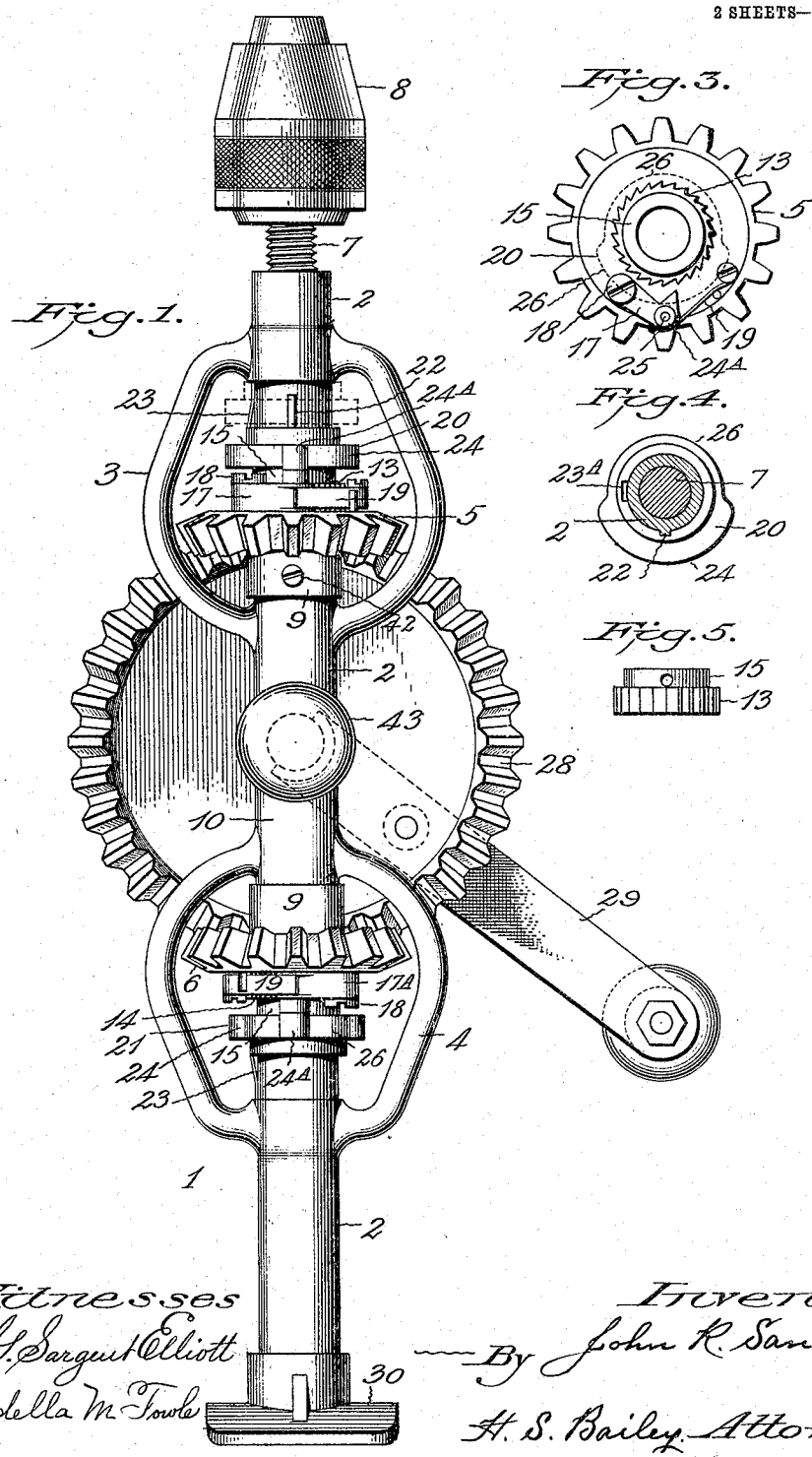

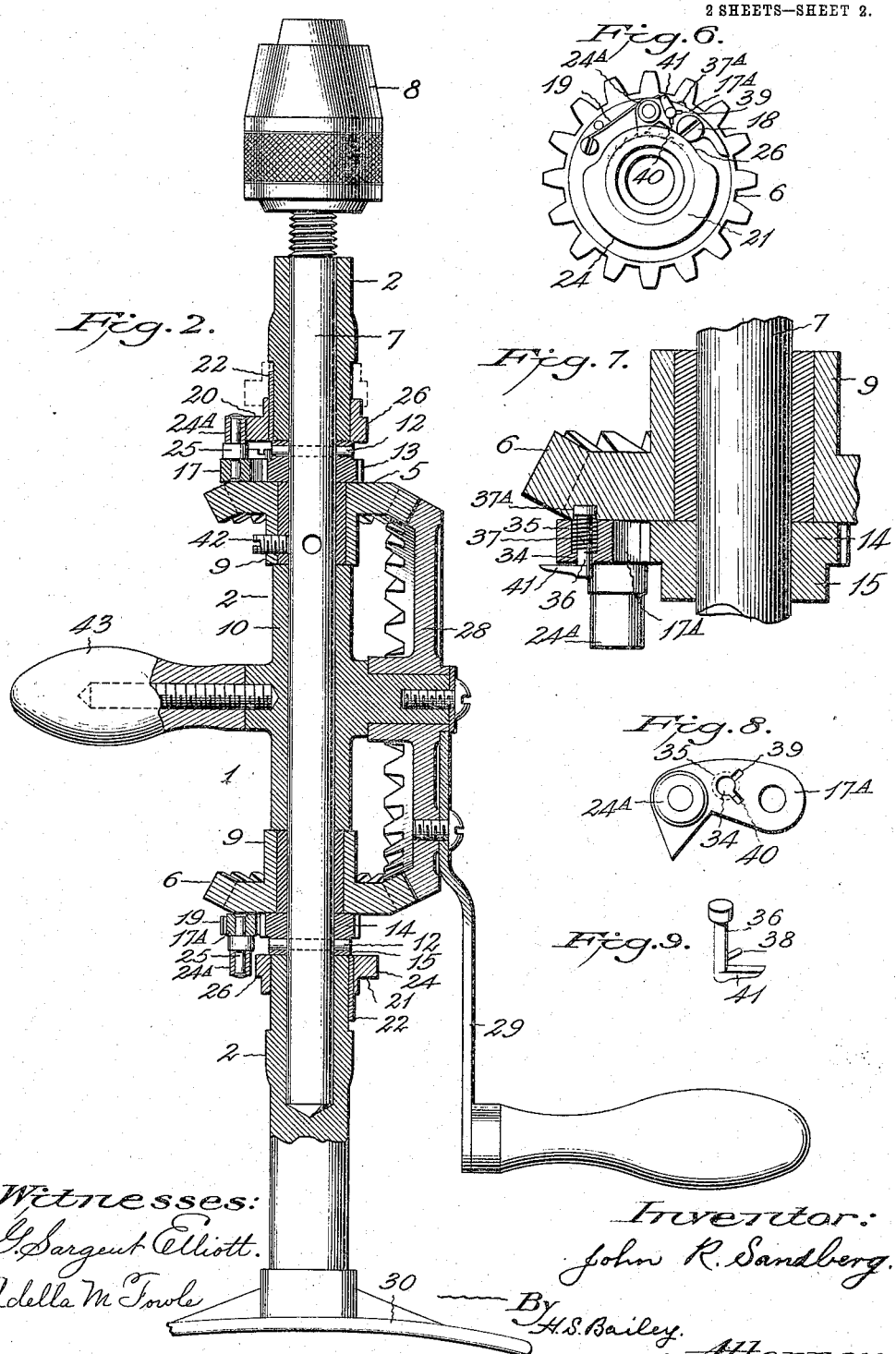

JOHN R. SANDBERG, OF DENVER, COLORADO.

COMBINED BREAST-DRILL AND VALVE-GRINDER.

No. 930,620.　　　　Specification of Letters Patent.　　　Patented Aug. 10, 1909.

Application filed August 21, 1908. Serial No. 449,746.

*To all whom it may concern:*

Be it known that I, JOHN R. SANDBERG, (having declared my intention of becoming a citizen of the United States of America,) residing in the city and county of Denver and State of Colorado, have invented a new and useful Combined Breast - Drill and Valve-Grinder, of which the following is a specification.

My invention relates to a combined valve grinder and breast drill, and the object of the invention is: to provide a drill of this character, comprising a frame in which is mounted a spindle having beveled pinions loosely mounted thereon, which are in mesh with an operating beveled gear wheel, said pinions carrying pawls which engage ratchet wheels secured to said spindle, adjustable cams being provided for alternately disengaging the pawls from the ratchets, the cams being oppositely positioned so that when one pawl is in engagement with its ratchet wheel the other pawl is inoperative, thereby giving to the spindle an oscillating or valve grinding movement, means being provided for locking one of said pawls out of engagement with its ratchet, which permits the machine to be operated as an ordinary drill; further, to provide cams for the pawls, having faces of un-even length, so that one of said pawls will engage its ratchet wheel for a longer period than the other pawl, whereby the spindle will be turned a greater distance in one direction than in the opposite direction. I attain these objects by the mechanism illustrated in the accompanying drawings, in which:

Figure 1, is a front elevation of the improved valve grinder, and breast drill, showing the parts arranged for valve grinding. Fig. 2, is a vertical longitudinal sectional view through the drill at right angles to the position shown in Fig. 1. Fig. 3, is a plan view of the forward driving bevel pinion, showing the ratchet wheel and the pawl, which is operated by the pinion, the cam for alternately disengaging the pawl from the ratchet wheel being shown in dotted lines. Fig. 4, is a plan view of the cam shown in dotted lines in Fig. 3. Fig. 5, is a side or edge view of the ratchet wheel shown in Fig. 3. Fig. 6, is a plan view of the backward driving beveled pinion and parts connected therewith. Fig. 7, is an enlarged vertical sectional view of a portion of the backward driving pinion and ratchet wheel, showing the pin for locking the pawl out of engagement with the said ratchet wheel. Fig. 8, is an enlarged plan view of the pawl shown in Fig. 7. And Fig. 9, is a perspective view of the locking pin used in connection with the said pawl.

Similar numerals of reference refer to similar parts throughout the several views.

Referring to the drawings, the numeral 1, designates the frame of my valve grinding and hole drilling tool. This frame comprises a stem portion 2, which is tubular throughout the greater portion of its length, and is provided adjacent to its opposite ends with loop portions 3 and 4; between the opposite end portions of each of these loop portions, the stem body portion of the frame is cut away, and in these spaces in the body bevel pinions 5 and 6 are placed, which are mounted on a spindle 7, that is fitted snugly but is rotatably mounted inside of the tubular portion of the frame. The spindle extends beyond the chuck end of the frame and on its end a chuck 8 of any suitable make is detachably secured. The bevel pinions are provided with a hub portion 9, and these pinions are rotatably mounted on the spindle with their hubs facing each other and positioned against the opposite ends of the central portion 10 of the frame. On the spindle at the side of each gear opposite to its hub portion, and fitting between the gear and the adjacent end of the frame in the loops of the frame, I place and mount on and secure to the shaft preferably by pins 12, ratchet wheels 13 and 14, and the ratchet teeth of one of these ratchet wheels are positioned opposite to those of the other. The pins 12 extend through hub portions 15, formed on the ratchet wheels, and also through the chuck holding spindle. On the outer face of each beveled pinion adjacent to the ratchet wheels, I pivotally secure a pawl by a screw 18. These pawls 17 and 17ᴬ are also positioned to stand in opposite directions from each other, and their tooth portions are each held in operative relation to their respective ratchet wheels by a spring 19, which is secured at one end to the face of the gear and is arranged to bear resiliently on the pawl, and thus hold it in engagement with the teeth of the ratchet wheel.

Upon the body portion of the frame within its loop portions and at the outer end portions that are adjacent to the open spaces in the body portion, I mount cams 20 and 21. These cams are slidably mounted on the body of the frame and are feathered against rotary movement thereon by feather keys 22, which are secured to the frame. These cams stand normally against the hub portions of the ratchet wheels, being held there by any suitable means, such as a spring 23, which is secured at one end to the frame and is arranged to form an abutment against the lateral sliding movement of the cams away from the ratchet wheels. The cam surfaces of these cams comprise disk portions, of two different radial diameters 24 and 26, the peripheral surfaces of which form the cam surfaces, and these cam surfaces are engaged by rollers 24$^A$, which project from the side of the toothed end portions of the pawls, the rollers 24$^A$ being mounted on pins 25 which are secured to the side of the pawls. The two radial diameter portions of these cams are arranged so that the larger diameter 24 when engaged by the roller of the pawl lifts the pawl out of engagement with the ratchet wheel, but when the pawl roller runs off of the larger diameter 24 onto the smaller diameter 26, the pawl is pressed into engagement with the teeth of its ratchet wheel. The two different radial cam portions of one of these cams are made of equal circumferential length, but on the other cam the smaller radial surface is made longer than the larger diameter in order that the pawl of this cam will engage its ratchet wheel for more than one half of its circumferential or rotary movement, for a purpose that will be presently described. These cams are also feathered on the frame with their cam surfaces positioned opposite each other. A bevel gear 28, which I term the driving gear, is pivotally mounted on the frame in a position to mesh with both beveled pinions, and a crank handle 29 is attached to this gear in a position to rotate it. The opposite end of the frame from the chuck end is provided with a plate 30, which is adapted to be placed against the breast of the operator when using the tool.

The operation of the elements of my invention is as follows, and they have been designed especially for the purpose of grinding valves and valve surfaces, and the gears and ratchet wheels and their pawls and cams impart an oscillating or rotary reciprocal movement to the spindle, and also an advancing step by step full rotary motion to the spindle, and its chuck, at the same time, in the following manner: The tool is grasped by one hand of the operator and its breast plate 30 is placed against his breast, while with the other hand he turns the crank and bevel gear. The rotation of the gear imparts rotary motion to the bevel pinions, which are loosely mounted on the spindle. The pawls rotate with the pinions and are held by the resilient pressure of their springs in engagement with the teeth of the ratchet wheels when the cam rollers of the pawls are in register with the lesser radial diameters of the cam surfaces, which ratchet wheels are secured to the chuck spindle and impart a partial rotative movement to them, but as the pinions rotate their pawl rollers engage the larger diameter surface of the cams and they are lifted out of engagement with the teeth of the ratchet wheel, and permit the pawls to ride over the teeth of the ratchet wheels as long as the pawl rollers ride on the larger diameter of the cams, and as the pawls and cams are positioned to operate in opposite directions they engage the ratchet wheels of the spindle in alternate order, and impart to them and to the chuck spindle a partial rotative movement in opposite directions, thus imparting an oscillating or rotary reciprocal movement to the spindle and its chuck, and in addition to this, as the smaller cam surface of one of the cams is larger than that of the other, the pawl roller of this cam allows its pawl to engage the teeth of its ratchet wheel longer, and consequently to move it farther than the other ratchet wheel does, and consequently a forward step by step rotary movement is imparted to the spindle and chuck beyond the reverse rotating movement imparted by the equal cam surface portioned cam, which results in a partial rotary movement being given to the spindle in advancing step by step rotary movements at the same time that it is going through its rotary reciprocal movements. In case an operator did not have sufficient room in which to rotate the crank, the same results can be obtained by moving the handle in short reciprocal partial rotative strokes. This combined rotary reciprocal and partial step by step creeping rotary movement is accomplished in the following manner: The valve to be ground is attached to the chuck and the operator holds it against the valve seat and grinds the two together with this continual oscillating and rotary movement with oil and other suitable material, until the two surfaces are ground evenly and smoothly together, to a perfect non-leaking fit. The progressive step by step rotary movement of the chuck and valve against its seat during the oscillating movement brings new portions of the surfaces of both the valve and its seat into contact at each reciprocal movement of the spindle, and prevents channel ruts from being formed in them and insures a perfect, even, smooth surface. Furthermore valves can be ground to their seats in much less time and with greater accuracy than by hand. This feature of my invention is especially adapted to grinding the valves of automobile engines, but is also adapted to all kinds of stationary and marine engines' valves that are not too large to be handled in this manner. I do not, however, illustrate a valve in the chuck, as the operation of securing a valve to the chuck and of holding it against its valve seat is well understood by machinists and repairers of automobiles.

Whenever it is advantageous to do so, the crank handle can be removed and a pulley or bevel gear, which I do not illustrate, may be secured to it and be arranged and adapted to be attached to any suitable supply of power. My improved tool is also adapted to be used as a ratchet drill by simply sliding either one or both of the cams backward out of engagement with the rollers of the pawls, and by locking one pawl out of engagement with its pinion. The sliding of the cams out of engagement with the rollers of the pawls is accomplished by pressing the springs 23, so that they will pass into slots 23^A, in the hubs of the cams, which permits the cams to be pushed back, and the frictional engagement of the springs 23^A with the faces of the cam slots, holds the cams away from and out of engagement with the rollers of the pawls and one of the pawls may be locked out of engagement with its pinion by any suitable means, but I preferably carry out this feature of my invention in the following manner, and preferably select the pawl 17^a at the handle end of the tool. Through this pawl I form an aperture of two different diameters 34 and 35, the larger diameter of which extends into the pawl from its rear side and extends nearly through it. In this aperture of two diameters I fit loosely a pin 36, which extends loosely through and beyond the smaller diameter of the aperture, and is provided with a head portion that fits loosely into the larger diameter of the aperture, and a coiled spring 37 is placed around the stem of the pin between the bottom of the larger portion of the aperture and the head of the pin, and normally holds the head of the pin against the pinion, and in the adjacent side of the pinion a hole 37^a is formed to receive the head of the pin, but this hole is positioned relative to the pin so that the pin will not register with and enter it until the tooth of the pawl is raised out of and clear of engagement with the teeth of its ratchet wheel, when it will be forced into the hole in the gear and will lock the pawl in a position in which its toothed end is out of engagement with the teeth of its ratchet. Both of the cams being locked out of engagement with the pawl rollers, and one pawl being locked out of engagement with its ratchet wheel, the spindle can be driven with a constant rotative movement by turning the crank handle and driving gear, which rotates both pinions, but the pawl 17 is in constant engagement with the ratchet wheel 13, and consequently rotates the said wheel and spindle as the pinion 5 rotates; the other pinion rotates also, but its pawl 17^A is locked out of engagement with its ratchet wheel by the pin 36, consequently it is inoperative relative to the ratchet wheel 14, and the spindle. The pin 36 which locks the pawl to the pinion 6, is provided with means for locking it out of engagement with its pinion when the pawl is used for driving its ratchet wheel, consisting of a transverse pin 38 near its outer end, which normally lies in a shallow slot 39 formed in the pawl at one side of the smaller aperture 34, the transverse pin 38 being arranged to hold the pin 36, out of the hole 37^a, and within the aperture 35 of the pawl, but when it is desired to lock the pawl out of engagement with its ratchet wheel, the transverse pin 38 is drawn out of its slot 39 and is turned around to a slot 40 formed in the pawl at right angles to the slot 39, and which is of sufficient depth to permit the head of the locking pin to enter the hole in the pinion, and thus lock the pawl out of engagement with its ratchet wheel. A knob or arm 41 is formed on the outer end of the pawl locking pin, which may be grasped by the fingers of the operator in manipulating the pin.

The tool can be used as a continuously rotating breast drill, by operating the crank handle with short reciprocal partial rotative movements instead of full rotative movements.

When using the tool as a breast or as a ratchet drill, it sometimes happens that a drill will stick in the hole being drilled and it would facilitate the freeing of the drill if it could be moved backward. I accomplish this feature by inserting a set screw 42 in the hub of the pinion 5, which is adapted to be screwed into a hole in the spindle and thus secure the pinion to the spindle; and as the pawl 17^a is out of engagement with its ratchet gear 14, the backward rotation of the operating handle will turn the chuck and its drill backward. A handle 43, is secured to the central portion 10 of the drill frame, which is grasped by the operator when the drill is supported against the breast.

My invention is simple and will provide a practical and handy tool for grinding valves and for breast and ratchet drilling.

Having described my invention, what I claim as new and desire to secure by Letters Patent, is:

1. In a combined valve grinding and a hole drilling tool, the combination with a supporting frame, a chuck spindle rotatably mounted in said frame, a pair of bevel pinions mounted on said frame, pawls secured to said pinions and arranged in opposite operative directions, ratchet toothed wheels secured to said spindle in operative relation to said pawls and arranged in opposing operative relationship to each other, means including cams for alternately disengaging said pawls from said ratchet toothed wheels at predetermined portions of their rotative movement, a chuck on said spindle, a breast plate on the end of said frame opposite to said chuck, a beveled gear mounted on said frame in mesh with said bevel pinions, and means for rotating said bevel gear.

2. In a combined valve grinding and drilling tool, the combination with a tubular frame, a chuck holding spindle rotatably mounted in said frame, a pair of oppositely arranged bevel pinions loosely mounted on said spindle, a bevel gear mounted on said frame in mesh with said pinions, means for rotating said bevel gear, a clamping device at the outer end of said spindle, and a breast plate at the opposite end of said frame from said spindle, with a pair of oppositely arranged ratchet toothed wheels secured to said spindle arranged each at the side of one of said pinions, a spring controlled pawl secured to each pinion and in operative mesh with said ratchet gears, a cam slidably and non-rotatably mounted on said frame adjacent to said pawls, a projection on each of said pawls in engagement with said cams, one of said cams being arranged to raise and hold one of said pawls out of engagement with its ratchet wheel during one-half of a rotative revolution of said ratchet wheel and spindle, and the other cam being arranged to hold the other pawl out of engagement with its ratchet wheel more than one-half of a rotative revolution of its ratchet wheel and of said spindle, whereby rotation of said pinions imparts an oscillating or partial rotative reciprocal movement to said spindle and at the same time a progressive step by step full rotative movement to said spindle.

3. In a machine as specified, the combination with a supporting frame, of a spindle mounted therein having beveled pinions loosely mounted thereon; an operating beveled gear in mesh with said pinions; ratchet wheels rigidly mounted on the spindle, pawls on the pinions adapted to engage the ratchet wheels; and means for automatically disengaging one pawl at or before the engagement of the other pawl with its wheel.

4. In a machine as specified, the combination with a supporting frame, having a spindle mounted therein, of beveled pinions loosely mounted on the spindle, and an operating beveled gear mounted on the frame, in mesh with the said pinions; oppositely set ratchet wheels rigid on the spindle; spring pressed pawls on the pinions adapted to engage the ratchet wheels; friction rollers on the pawls; oppositely set cams in the paths of the said rollers by which the pawls are disengaged from the ratchets in alternate order; and means for locking one of the pawls in an inoperative position.

5. In a machine as specified, the combination with a frame, a spindle mounted in the frame, beveled pinions loosely mounted on the spindle, and means for rotating said pinions in opposite directions, of oppositely set ratchet wheels rigidly secured upon the spindle; pawls on the pinions adapted to engage the ratchet wheels; rollers on the pawls; oppositely set cams in the paths of the said rollers, having faces of different lengths, whereby said pawls are disengaged from the ratchet wheels in alternate order, and for different periods of time; and a spring operated pin in one of said pawls, which is adapted to enter a hole in the adjacent beveled pinion and lock the said pawl in an inoperative position.

6. In a machine as specified, the combination with a frame, a spindle mounted in the frame, beveled pinions loosely mounted on the spindle, and means for turning the pinions in opposite directions, of oppositely set ratchet wheels rigidly secured upon the spindle; spring pressed pawls pivotally mounted on the pinions, which are adapted to engage the ratchet wheels; rollers on the free ends of said pawls; oppositely set cams slidable on said frame, which project into the paths of the rollers and disengage the pawls from the cams in alternate order; feathers on said frame for preventing axial movement of the cams, and a spring pressed pin in one of said pawls which is adapted to enter a hole in the adjacent pinion, and lock the said pawl in an inoperative position.

7. In a device as specified, the combination with a frame, comprising three tubular sections in axial line, connected by arms so as to leave an interval between the middle section and each end section, a handle on the middle section, and an operating beveled gear on the middle section, opposite the handle; of a spindle mounted in said frame, having a chuck on its outer end; a pair of oppositely set ratchet wheels on said spindle; beveled pinions loosely mounted on the spindle, between the ratchet wheels and the ends of the middle frame section; pawls on said pinions adapted to engage the ratchet wheels and having rollers on their free ends; oppositely set cams feathered to the end sections of the frame and projecting into the paths of the rollers, which cause the pawls to move out of engagement with the ratchet wheels in alternate order; and means for locking one of said pawls in an inoperative position.

8. In a device as specified, the combination with a frame, a spindle mounted in the frame, beveled pinions loosely mounted on the spindle and pawls mounted on the pinions; of oppositely set ratchet wheels secured upon the spindle adapted to be engaged by the pawls; means for automatically disengaging one of the pawls from its wheel at or before the engagement of the other pawl with its wheel; means for locking one of said pawls to the adjacent pinion in an inoperative position; and means for rotating the pinions in opposite directions.

In testimony whereof I affix my signature in presence of two witnesses.

JOHN R. SANDBERG.

Witnesses:
G. SARGENT ELLIOTT,
ADELLA M. FOWLE.